July 12, 1960  D. P. YUSZ  2,944,695
BOTTLE CONTAINER

Filed June 13, 1957  2 Sheets-Sheet 1

INVENTOR.
DANIAL P. YUSZ
BY *Charles L. Lovercheck*
ATTORNEY

July 12, 1960 D. P. YUSZ 2,944,695
BOTTLE CONTAINER

Filed June 13, 1957 2 Sheets-Sheet 2

INVENTOR.
DANIAL P. YUSZ
BY Charles L. Lovercheck
ATTORNEY ial P. Yusz, 1027 Cranberry St., Erie, Pa.

United States Patent Office 2,944,695
Patented July 12, 1960

2,944,695

BOTTLE CONTAINER

Danial P. Yusz, 1027 Cranberry St., Erie, Pa.

Filed June 13, 1957, Ser. No. 665,544

1 Claim. (Cl. 220—21)

This invention relates to bottle covers and, more particularly, to covers for cases of milk bottles.

Milk is usually delivered to homes from the dairy in bottles or paper cartons. These bottles or cartons are carried in cases having several bottles or cartons per case. During warm weather, it is difficult to keep the milk cool while it is being delivered. Refrigerated trucks are often resorted to but they are expensive and are impractical in cold weather because no refrigeration is required then. Ice carried in the truck is often resorted to for keeping the containers cold. The ice melts and forms water which results in inconvenience and a distasteful condition in the truck and for the driver of the truck.

The present invention proposes an improved type of cover for milk bottle cases to keep out the warm air from around the milk bottles. One of the improved covers disclosed herein will be put on top of each case of milk. Then the cases can be stacked with one case resting on top of the cover of the case below it. The cover of the case below will form a complete airtight bottom and, with the case and top, will form a compartment for the milk bottles which will prevent convection currents of air from warming the milk. The bottles in each case will be in a separate airtight compartment from the others.

It is, accordingly, an object of this invention to provide an improved cover for milk container cases and, more particularly, it is an object of this invention to provide a cover which is simple in construction, economical to manufacture, and simple and efficient to use.

Another object of this invention is to provide a cover for a milk container case wherein the cover will fit up into the bottom of the case above it and, therefore, form a bottom of the case above it.

A further object of the invention is to provide a cover for a milk bottle case which forms a compartment which will keep the milk bottles in the case cool.

With the above and other objects in view, the present invention consists of the combination and arrangement of parts hereinafter more fully described, illustrated in the accompanying drawings and more particularly pointed out in the appended claim, it being understood that changes may be made in the form, size, portions, and minor details of construction without departing from the spirit or sacrificing any of the advantages of the invention.

Figure 2:
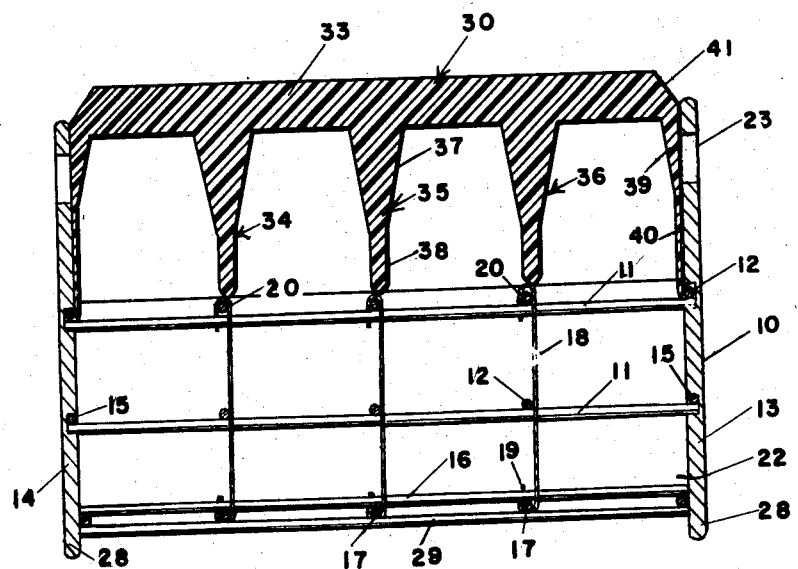
Fig. 2 is a longitudinal cross sectional view of the milk bottle case cover shown in Fig. 1 disposed in closing relation on the bottle case.
Figure 1:
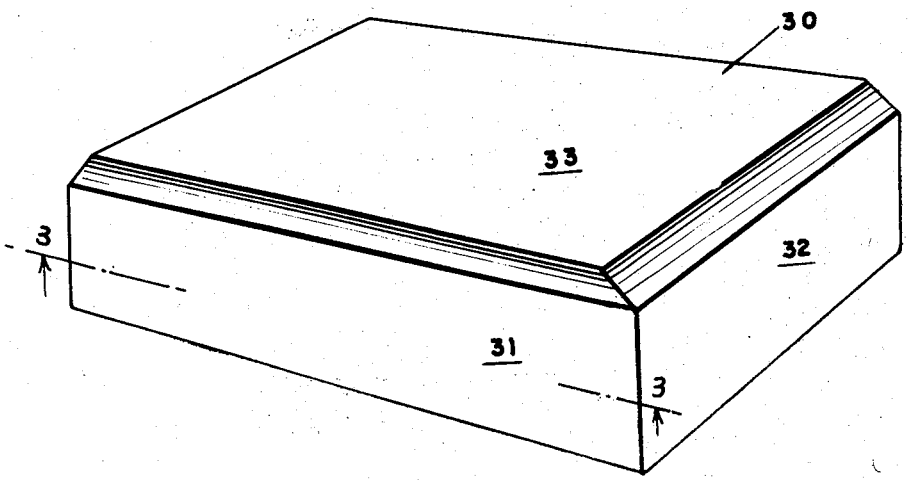
Fig. 1 is an isometric view of a milk bottle case cover according to the invention which has been removed from the milk bottle case.
Figure 3:
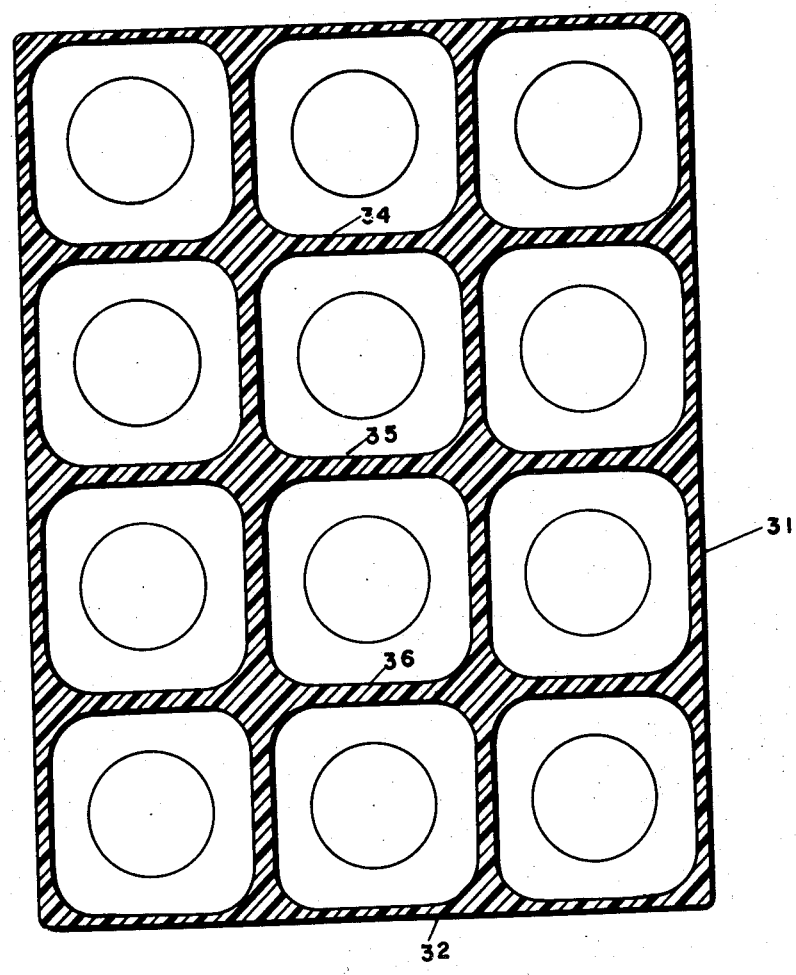
Fig. 3 is a cross sectional view taken on line 3—3 of Fig. 1.

Now with more specific reference to the drawings, a milk bottle case 10 is shown having longitudinal wire partitions 11 and transverse partitions 12 held together with ends 13 and 14 notched at 15 to receive the transverse members 12. Wires 16 rest on bottom transverse wires 17 and form a support for milk bottles between vertical tie wires 18 which are hooked at the bottom at 19 and out at the top at 20 to hold the wire frame together.

Sides 22 and the ends 13 and 14 of the case 10 extend upwardly a substantial distance above the topmost partition member 11 and have hand receiving openings at 23 therein. Lower ends 28 of the sides 22 and the ends 13 and 14 extend down below the bottom wires 17 and bottom members 29 a substantial distance.

A cover 30 may be made from plastic, preferably molded, and has a side 31 and ends 32. A top 33 of the cover 30 has depending partitions 34, 35, and 36 which extend longitudinally and transversely and which have enlarged cross sectional portions 37 and a reduced size portion 38 so that in cross section, the partitions 34, 35, and 36 generally define conical bottle receiving spaces. The ends of the partitions 34, 35, and 36 are thicker at intermediate parts 39 than they are at lower ends 40 and the lower ends 40 overlie the openings 23 in the end members and, therefore, seal them against the entrance of air. The upper edge of the cover 30 is slanted upwardly at 41 so that it will readily enter between the lower ends 28 of the sides and ends of the side members and end members of another case sitting on top of the case 10.

It will readily be apparent that when the covers 30 are supported on milk bottle cases such as the case 10, the sides of the cover 30 will fit down snugly into the top of the case 10 and the milk bottles will individually fit into the top. They will be held in spaced relation from each other. Also, the circulation of air by convection will be prevented. Further, the top of one case will form the bottom of another case.

The foregoing specification sets forth the invention in its preferred practical forms but the structure shown is capable of modification within a range of equivalents without departing from the invention which it is to be understood is broadly novel as is commensurate with the appended claim.

The embodiments of the invention in which an exclusive property or privilege is claimed are defined as follows:

In combination, a milk bottle case and a cover therefor, said case having sides, ends, and a bottom defining a space therein, and partitions dividing said case into a plurality of milk bottle receiving compartments, said partitions terminating a substantial distance from the upper edge of said case, said cover being molded in the form of a solid integral plastic body having downwardly facing recesses therein, the wall surface defining each of said recesses comprising an upper portion and a lower portion, said upper portion being circular at its top and flaring in a downward direction to a generally square configuration at its bottom, said lower portion being of the same transverse configuration and size throughout its height as the bottom of said upper portion, said recesses in said cover being adapted to receive the necks of milk bottles disposed in said compartments, the lowermost part of the material of said cover between said recesses resting on said partitions between said compartments, said cover extending into said case from the top thereof to said partitions and resting thereon, the outer sides and end surfaces of said cover interfitting into said case, the upper edges of said cover adjacent the top thereof extending above the sides of said case and slanting upwardly and inwardly to interfit into the lower part of another case adapted to rest on top of said case and said cover.

References Cited in the file of this patent

UNITED STATES PATENTS

| | | |
|---|---|---|
| 1,187,566 | Taylor | June 20, 1916 |
| 1,310,161 | Johnson | July 15, 1919 |
| 1,975,128 | Sherman | Oct. 2, 1934 |
| 1,991,770 | Pawsat | Feb. 19, 1935 |
| 2,025,769 | O'Dell | Dec. 31, 1935 |
| 2,176,275 | Pierce | Oct. 17, 1939 |
| 2,411,673 | Vechey | Nov. 26, 1946 |